Aug. 7, 1945.   C. A. NORGREN   2,381,554
COMPRESSION FITTINGS
Filed Aug. 27, 1942

INVENTOR.
Carl A. Norgren
BY
ATTORNEY

Patented Aug. 7, 1945

2,381,554

UNITED STATES PATENT OFFICE 2,381,554

COMPRESSION FITTING

Carl A. Norgren, Denver, Colo.

Application August 27, 1942, Serial No. 456,377

3 Claims. (Cl. 285—120)

This invention relates to lock joint couplings and relates more particularly to compression fittings for attachment of flexible metallic tubing to various objects.

In recent years, flexible metallic tubing, usually copper, has come into widespread use in many industrial applications. Copper, being a ductile material, tends to harden in any place it is bent or moved to an appreciable degree. Consequently, any fastening which severely distorts the metal of the tubing in order to form a sealed union therewith, increases the tendency of the metal to break at the point or points where it is subjected to the greatest stresses from vibration and similar causes.

Likewise, couplings which distort the metal of the tubing to an appreciable degree cause the inner surface of the tube to be deformed and thus cut down the effective area of the passage and increase friction in the movement of fluids therethrough.

It is an object of the present invention to provide a compression fitting which affords an effective seal against passage of fluids without appreciable deformation of the walls of the passage through which the fluid flows.

Another object of the invention is to provide a compression member in such a fitting which may be inserted on the tube with either end forward without impairing function.

A further object of the invention is to provide a compression fitting in which the forces effecting the sealing action are distributed over a relatively large area with a minimum of distortion resulting in a reduction in hardening action from which weakening of the ductile metal occurs.

A still further object of the invention is to provide a compression fitting in which the loosening effect of vibrations is retarded.

Other objects reside in novel details of construction and novel combinations and arrangements of parts, all of which will appear more fully in the course of the following description.

To afford a better understanding of the invention, reference will be made to the accompanying drawing, and in the drawing in the several views of which like parts have been designated similarly:

Figure 1:
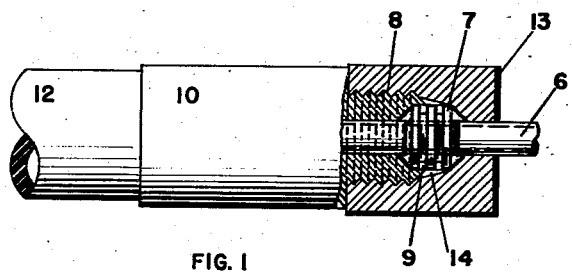
Figure 1 is a side elevation, partially in section illustrating an embodiment of the invention.

The coupling of the present invention comprises a piece of flexible metallic tubing 6, at the free end of which a compression member 7 in the form of a thick sleeve fitting closely about the tube is held in frictional engagement. The end of the tube is placed in telescoping relation with a hollow stem member 8, the outer end of which terminates in a tapered recess 9 in which compression sleeve 7 extends.

This stem may be mounted on any suitable object such as a valve, conduit or the like, here illustrated as a hose coupling 10 carried at the end of a rubber hose 12. The stem is externally threaded, and a nut 13 having an internally-threaded recessed portion 14 and a smaller bore to admit tubing 6, is screwed on the stem and applies compression to sleeve member 7.

This sleeve is made of a semi-hard material, usually brass or steel, which possesses sufficient resilience to tend to return to its former position after release of pressure. The sleeve is relatively heavy and is provided with one or a plurality of annular grooves 15 extending deep enough into the material of the sleeve to permit distortion of the sleeve under the compression influences. The sleeve thus constitutes a series of two or more heavy ring portions and intermediate resilient deformable connecting portions.

Figure 2:
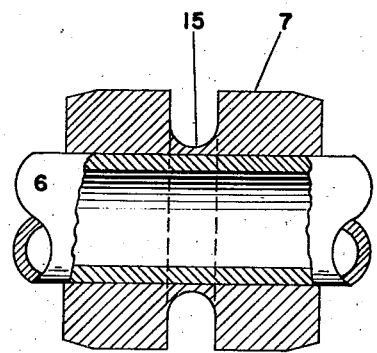
Figure 2 is a fragmentary section drawn to an enlarged scale illustrating one embodiment of a compression member and associated tubing before compression has been applied.
Figure 4:
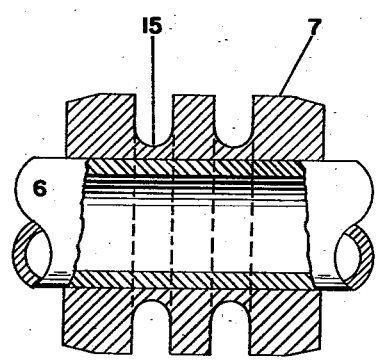
Figure 4 is a fragmentary section drawn to an enlarged scale, illustrating another embodiment of a compression member and associated tubing before compression.

To further facilitate and direct the movement of the sleeve material under the compression influences, the walls of the grooves 15 are rounded as illustrated in Figures 2 and 4, and this curvature serves to direct the forces of compression toward tube 6. During the compression of the sleeve the ring portions which closely surround the tube thus act as supports or guides for the connecting portions and compel movement of the connecting portions to grip and deform the tube.

Figure 3:
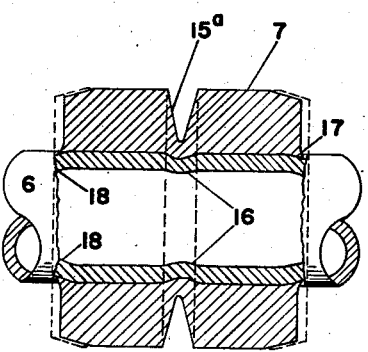
Figure 3 is a similar fragmentary section through the device of Figure 2 after compression has been applied.
Figure 5:
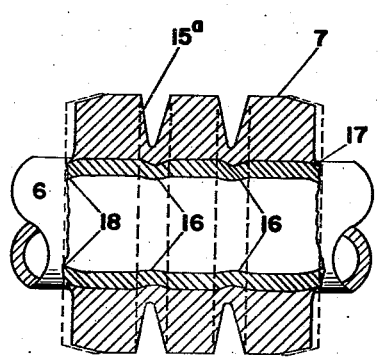
Figure 5 is a similar fragmentary section through the device of Figure 4 after compression has been applied.

As a result the tube is partially deformed in the zone in radial alinement with the grooves as indicated at 16 in Figures 3 and 5, but not to a degree sufficient to materially restrict the flow of fluid through tube 6. At the same time the ends of the compression sleeve also are deformed and form protruding edges 17 that bite into the tube 6.

This action serves to provide three sealing zones in the single groove sleeve as illustrated in Figure 3, or four sealing zones in the dual groove sleeve illustrated in Figure 5. For clarity in illustration the end depressions 18 and the intermediate depressions 16 have been drawn to an enlarged scale in Figures 3 and 5, but in actual practice make an almost imperceptible change in the contour of the interior surface of tube 6. Similarly, the compressed grooves 15a are not exact representations but illustrate in a general way the changed shape resulting from compression.

By distributing the forces of compression acting on the sleeve over a number of sealing surfaces, sufficient distortion of the sleeve is obtained to get the desired union with the ductile material of the tube without distorting it to such a degree that it is hardened to any considerable extent which would thus render it more susceptible to breakage.

By developing a sealed union of the type shown in Figure 3 or 5, the series of circular impression zones insure a positive seal even if the surface of the tube is marred or out of round. Further, the extent of the deformation of the tube is so controlled that the inner passage is not appreciably changed in size and hence no material impedance of flow through the tube results.

Through the use of resilient material in the compression sleeve which tends to straighten in the manner of a spring when there is any release of pressure, a lock-nut type of fastening is obtained which affords effective resistance to vibration influences. Consequently, any tendency of nut 13 to move back along the thread of stem 8 is compensated by a following action in sleeve 7 which maintains sufficient frictional engagement to prevent continuance of the loosening action.

To control the degree of distortion in the form of the invention illustrated in Figures 4 and 5, the grooves are of uniform depth and positioned in uniform relation to the respective ends of the sleeve. Further, the curvature of the inner groove-defining surface is calculated to offset any buckling tendencies and direct the sleeve material into forcible engagement with the material of the tube.

Changes and modifications may be availed of within the spirit and scope of the invention as defined in the hereunto appended claims.

What I claim and desire to secure by Letters Patent is:

1. In compression fittings, the combination with a tube of relatively ductile material which upon undue distortion tends to be changed in properties and thereby subject to fracture at or adjacent the fitting, of an encompassing sleeve in close engagement with the tube and means for compressing said sleeve longitudinally, said sleeve being relatively thick and having at least one radial groove extending sufficiently close to the inner surface of said sleeve so that the material of said sleeve beneath said groove will upon compression be forced into deforming engagement with said tube, but deformation of said tube will be insufficient to produce detrimental changes in the material of said tube, the material of said sleeve having a hardness greater than that of the tube so that the ends of said sleeve upon compression tend to be forced into said tube, the outer periphery of said sleeve and said compressing means having cooperating surfaces sloped so as to tend to force the ends of said sleeve into said tube, and the material of said sleeve also being sufficiently resilient so that upon any reduction of the compressive forces, said sleeve tends to return to its initial shape, thereby exerting continued resistance pressure against said compression means.

2. In compression fittings, the combination with a tube of relatively ductile material which upon undue distortion tends to be changed in properties and thereby subject to fracture at or adjacent the fitting, of an encompassing sleeve in close engagement with the tube and means for compressing said sleeve longitudinally, said sleeve being relatively thick and having a plurality of longitudinally spaced radial grooves extending sufficiently close to the inner surface of said sleeve so that the material of said sleeve beneath the grooves upon compression will be forced into deforming engagement with said tube, but deformation of said tube will be insufficient to produce detrimental changes in the material of said tube, the material of said sleeve having a hardness greater than that of the tube so that the ends of said sleeve upon compression tend to be forced into said tube, and the material of said sleeve being sufficiently resilient so that upon any reduction of the compressive forces said sleeve tends to return to its initial shape, thereby exerting continued resistance pressure against said compression means.

3. In compression fittings, the combination with a tube of relatively ductile material which upon undue distortion tends to be changed in properties and thereby subject to fracture at or adjacent the fitting, of an encompassing sleeve in close engagement with the tube and means for compressing said sleeve longitudinally, said sleeve being relatively thick and having at least one radial groove extending sufficiently close to the inner surface of said sleeve so that the material of the sleeve beneath said groove upon compression will be forced into deforming engagement with said tube, but deformation of said tube will be insufficient to produce detrimental changes in the material of said tube, the material of said sleeve having a hardness greater than that of the tube so that the ends of said sleeve upon compression tend to be forced into said tube, and the material of said sleeve also being sufficiently resilient so that upon any reduction of the compressive forces said sleeve tends to return to its initial shape, thereby exerting continued resistance pressure against said compression means.

CARL A. NORGREN.